April 29, 1947. P. H. STANLEY 2,419,604
ROTATIVE WINGED AIRCRAFT HAVING A PLURALITY
OF YAW-MOMENT PRODUCING MEANS
Filed March 20, 1944
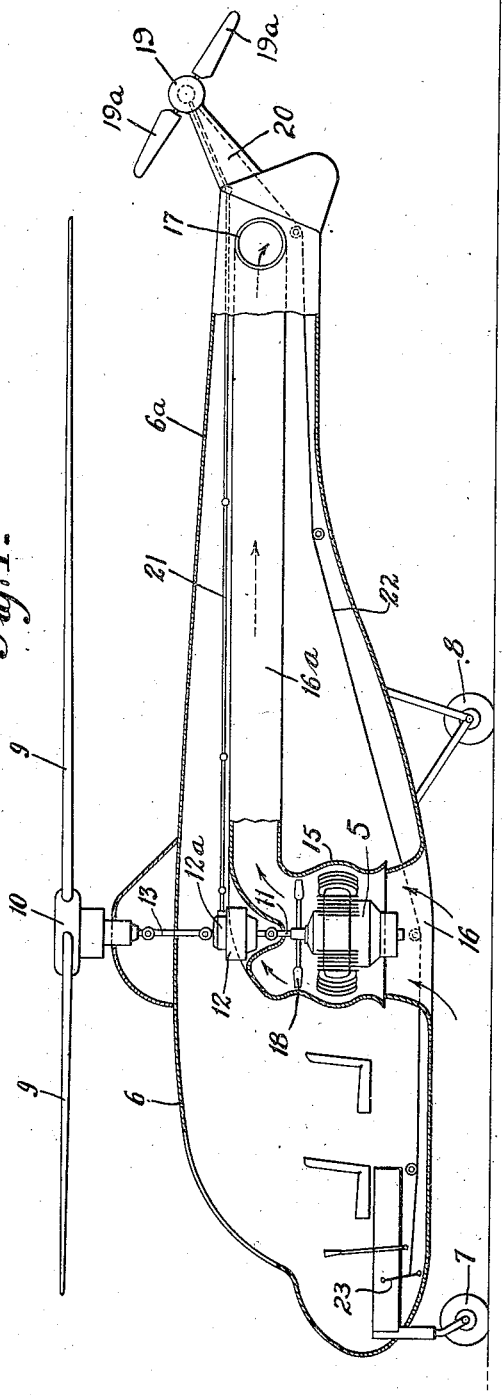
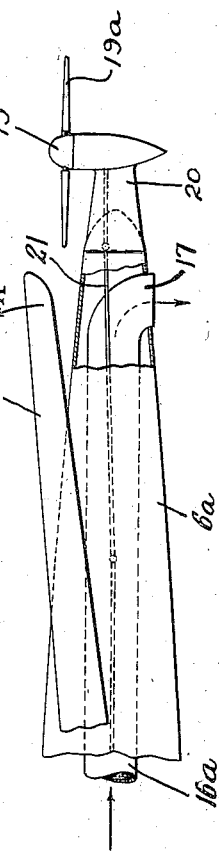
INVENTOR.
Paul H. Stanley
BY
ATTORNEYS Patented Apr. 29, 1947

2,419,604

UNITED STATES PATENT OFFICE 2,419,604

ROTATIVE WINGED AIRCRAFT HAVING A PLURALITY OF YAW-MOMENT PRODUCING MEANS

Paul H. Stanley, Huntingdon Valley, Pa., assignor to Autogiro Company of America, Philadelphia, Pa., a corporation of Delaware Application March 20, 1944, Serial No. 527,173

6 Claims. (Cl. 244—17)

This invention relates to rotative winged aircraft and especially to that type of aircraft having a sustaining rotor driven through the rotor hub by power means in the body of the aircraft, in consequence of which a reactive torque is set up in the body, tending to rotate the body in a direction opposite to the direction of rotation of the rotor. The invention is particularly concerned with a novel system for setting up yaw moments such as are needed for torque counteraction.

An important object of the invention is the employment of a fluid pressure jet device located at an appreciable distance from the axis of rotation of the rotor and directed so as to set up a torque counteractive force, together with additional means for counteraction of torque, preferably in the form of a torque counteractive rotor, which latter is driven from the rotor driving engine. The invention contemplates an arrangement in which the air blast employed for cooling the rotor driving engine is delivered to the jet device and supplies the pressure fluid thereto. In this way the means employed for setting up the engine cooling air blast serves also as the source of jet reaction fluid.

It is contemplated that a normal size engine cooling blower be employed and that additional torque counteractive force be provided by the employment of a relatively small diameter torque counteractive rotor.

It is further contemplated that control of the overall torque counteractive force, and thus also control of the aircraft in yaw, be secured by employing an adjustable torque counteractive rotor, desirably one in which the rotor blade pitch angle is variable whereby to vary the thrust of the rotor.

How the foregoing and other objects and advantages are obtained will appear more fully from the following description referring to the accompanying drawings in which—

Figure 1 is a vertical sectional view through an aircraft arranged in accordance with this invention, various of the parts being shown in outline or in elevation; and Figure 2 is a plan view of the rear end portion of the fuselage or body of the aircraft, with parts in horizontal section and with a portion of one of the blades of the sustaining rotor also illustrated.

Referring first to the aircraft of Figure 1, the body is indicated at 6, the machine being provided with suitable landing gear such as indicated at 7—8 and a sustaining rotor incorporating blades 9 which are connected with hub 10. The sustaining rotor may incorporate any suitable number of blades, it being assumed that in both forms herein shown a three-bladed rotor is used. Each blade is desirably connected with the hub by means of pivots providing for swinging movements of the blade at least in a direction generally transverse the mean rotative path of travel. In addition provision is made for change of blade pitch angle to vary the lift of the rotor. The pitch angle of the blades is also controllable in a sense to angularly shift the lift line with respect to the center of gravity in order to introduce controlling moments in pitch and roll. Angular shift of the lift line may also be used to tilt the aircraft and thus induce translational flight. The specific form of blade mounting and blade pitch control is not illustrated herein since it forms no part of the present invention per se.

According to the invention the sustaining rotor is adapted to be driven by an engine 5 mounted in the body of the aircraft, desirably on a vertical axis, so that the engine shaft 11 may conveniently be connected with the rotor to drive the latter. For this purpose a gearing and clutch unit 12 and shafting 13 are provided, the gearing and clutch unit including a manually operable clutch of known type by which the rotor may be disconnected from the engine. Advantageously an overrunning clutch is also included in the transmission, preferably at a point close to the engine, for example, in the transmission unit 12, so that upon engine failure the rotor is free to overrun the drive transmission and the engine. With respect to overrunning of the rotor or disconnection of the manual clutch, it is mentioned that the blade pitch control advantageously provides for setting of the blades at a pitch angle suitable for effecting autorotation or air actuation of the rotor for purposes of descent without power.

As seen in Figure 1 a chamber 15 surrounds the engine 5, this chamber having an inlet opening 16 at the bottom of the body, through which engine cooling air may be drawn. The chamber 15 connects with a large duct 16a which extends rearwardly through the extension 6a of the body to deliver air to the jet device 17. This jet device may take the form of an elbow which is turned laterally of the aircraft.

A fan or blower 18 mounted on the engine shaft 11 serves to set up a blast of cooling air which is delivered to the duct 16a and ultimately discharged through the jet device 17.

It is contemplated that the fan or blower 18 be of normal capacity, i. e., adequate only for engine cooling purposes. However, provision is made for additional torque counteractive force, under at least some conditions of operation by the employment of a torque counteractive rotor or airscrew at the tail of the machine.

In an arrangement such as shown, the tail boom or extension 6a may, if desired, be relatively short.

The torque counteractive rotor incorporates a plurality of blades 19a connected with a hub 19 which is mounted on a support 20 extended at the rear end of the body somewhat beyond the location of the jet 17. This torque counteractive rotor is adapted to be driven through shafting 21 which extends forwardly to the gear-box 12a incorporating gearing for coupling the shafting with the engine. As is mentioned above, the transmission unit 12 desirably incorporates both a manual and an overrunning clutch which will be effective with respect to the anti-torque rotor as well as the sustaining rotor.

The blades 19a of the torque counteractive rotor are mounted to provide for change of blade pitch, which may be controlled by a cable system 22 extended forwardly to be coupled with the rudder pedals 23. The pitch control preferably includes a "zero" pitch position, whereby to reduce the torque counteractive force of the tail rotor to zero. Moreover, for full control under certain operating conditions the pitch of the anti-torque rotor is desirably adjustable to both positive and negative values with respect to the zero setting.

In the system described, therefore, the torque counteracting rotor 19—19a supplements the torque counteractive effect of the jet 17. Since the rotor is relied upon for only a portion of the torque counteractive effect, it may be made of smaller or lighter construction, than in machines in which the entire torque counteractive force is derived from a rotor or airscrew.

I claim:

1. In an aircraft having a body, a sustaining rotor, and an engine mounted on the body and connected to drive the rotor with a substantial unbalanced torque reaction on the body, a plurality of yaw-moment producing means actuable in a sense to oppose the said torque reaction, at least one of which is constructed and arranged to be driven by the said engine and which becomes substantially ineffective when the said engine is inoperative, and another of which is constructed and arranged to be driven by the sustaining rotor when the engine is inoperative.

2. In an aircraft having a body, a sustaining rotor, and an engine mounted on the body and connected to drive the rotor with substantial unbalanced torque reaction on the body, two yaw-moment producing means, both of which are constructed and arranged to be driven by the engine, one of which is constructed and arranged to be driven by the sustaining rotor when the engine is inoperative, and the other of which becomes substantially ineffective when the engine is inoperative.

3. In an aircraft having a body, a sustaining rotor, and an engine mounted on the body and connected to drive the rotor with substantial unbalanced torque reaction on the body, two yaw-moment producing means actuable in a sense to oppose the said torque reaction, one of which is connected with the sustaining rotor and produces a yaw-moment which is a function of rotor speed, and the other of which is operatively associated with and actuable by the engine in a manner to produce a yaw-moment which is a function of engine power output.

4. In an aircraft having a body, a sustaining rotor, and an engine mounted on the body and connected to drive the rotor with substantial unbalanced torque reaction on the body, means for cooling the engine, comprising means for setting up a stream of air, means for utilizing the energy in the said air to produce appreciable yaw moments in a sense to oppose the said torque reaction, and further means connected to the sustaining rotor in a manner to produce a yaw moment which is a function of sustaining rotor speed.

5. A construction in accordance with claim 4 in whih the first yaw-moment producing means comprises a reaction jet nozzle.

6. In an aircraft having a body, a sustaining rotor, and an engine mounted on the body and connected to drive the rotor with substantial unbalanced torque reaction on the body, means for cooling the engine comprising means for setting up a stream of air, reaction jet means for utilizing the energy in the said air to produce appreciable yaw moments in a sense to oppose the said torque reaction, and further yaw-moment producing means comprising a rotor constructed and arranged to be actuated by the engine when the engine is operative and by the sustaining rotor when the engine is inoperative.

PAUL H. STANLEY.

REFERENCES CITED

The following references are of record in the file of this patent:

UNITED STATES PATENTS

| Number | Name | Date |
| --- | --- | --- |
| 1,922,167 | Leray | Aug. 15, 1933 |
| 2,041,789 | Stalker | May 26, 1936 |
| 2,318,259 | Sikorsky | May 4, 1943 |
| 2,369,652 | Avery | Feb. 20, 1945 |

FOREIGN PATENTS

| Number | Country | Date |
| --- | --- | --- |
| 403,730 | French | Oct. 2, 1909 |
| 687,482 | French | Apr. 28, 1930 |